United States Patent
Aoki et al.

(10) Patent No.: US 10,277,458 B2
(45) Date of Patent: Apr. 30, 2019

(54) GATEWAY APPARATUS AND SYSTEM

(71) Applicant: FUJITSU LIMITED, Kawasaki-shi, Kanagawa (JP)

(72) Inventors: Yuta Aoki, Kawasaki (JP); Osamu Yamano, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/703,596

(22) Filed: Sep. 13, 2017

(65) Prior Publication Data

US 2018/0006879 A1   Jan. 4, 2018

Related U.S. Application Data

(63) Continuation of application No. PCT/JP2015/064970, filed on May 25, 2015.

(51) Int. Cl.
*H04L 12/24* (2006.01)
*H04W 24/02* (2009.01)
(Continued)

(52) U.S. Cl.
CPC ......... *H04L 41/0803* (2013.01); *H04W 16/32* (2013.01); *H04W 24/02* (2013.01);
(Continued)

(58) Field of Classification Search
CPC .. H04L 41/0803; H04W 16/32; H04W 24/08; H04W 88/18; H04W 92/045
(Continued)

(56) References Cited

U.S. PATENT DOCUMENTS

| | | | |
|---|---|---|---|
| 6,816,897 B2 * | 11/2004 | McGuire | H04L 41/0213 709/203 |
| 2003/0033400 A1 * | 2/2003 | Pawar | G06F 11/302 709/223 |

(Continued)

FOREIGN PATENT DOCUMENTS

| | | |
|---|---|---|
| JP | 2012-039366 A | 2/2012 |
| JP | 2012-119826 A | 6/2012 |

(Continued)

OTHER PUBLICATIONS

Translation of International Search Report of International Patent Application No. PCT/JP2015/064970 dated Jul. 28, 2015.

*Primary Examiner* — William Nealon
(74) *Attorney, Agent, or Firm* — Arent Fox LLP

(57) ABSTRACT

A gateway apparatus including a first inter-device interface configured to communicate with a monitoring apparatus; a second inter-device interface configured to communicate with multiple subordinate base station apparatuses; a memory; and a processor coupled to the memory. The processor is configured to generate first configuration information when second configuration information is received from the monitoring apparatus via the first inter-device interface. The processor generates the first configuration information by performing protocol conversion of converting the second configuration information into a format adapted to the second inter-device interface for the multiple base station apparatuses. The processor is further configured to transmit the generated first configuration information to the multiple base station apparatuses via the second inter-device interface, and divide the multiple base station apparatuses into predetermined groups. The processor transmits (Continued)

the first configuration information to the multiple base station apparatuses at a different timing for each of the groups.

5 Claims, 20 Drawing Sheets

(51) Int. Cl.
*H04W 84/04* (2009.01)
*H04W 88/16* (2009.01)
*H04W 92/12* (2009.01)
*H04W 88/18* (2009.01)
*H04W 16/32* (2009.01)
*H04W 24/08* (2009.01)
*H04W 92/04* (2009.01)

(52) U.S. Cl.
CPC ........... *H04W 24/08* (2013.01); *H04W 88/16* (2013.01); *H04W 88/18* (2013.01); *H04W 84/045* (2013.01); *H04W 92/045* (2013.01); *H04W 92/12* (2013.01)

(58) Field of Classification Search
USPC .......................................................... 455/449
See application file for complete search history.

(56) References Cited

U.S. PATENT DOCUMENTS

| | | | |
|---|---|---|---|
| 2006/0056315 A1* | 3/2006 | Oman | ................. H04L 41/0803 370/254 |
| 2012/0039171 A1 | 2/2012 | Yamada et al. | |
| 2012/0170503 A1 | 7/2012 | Kelley et al. | |
| 2012/0257504 A1 | 10/2012 | Ballot et al. | |
| 2013/0294396 A1 | 11/2013 | Iwamura et al. | |
| 2014/0051419 A1* | 2/2014 | Brend | ............... H04W 52/0206 455/418 |

FOREIGN PATENT DOCUMENTS

| | | |
|---|---|---|
| JP | 2012-529806 A | 11/2012 |
| JP | 2013-507809 A | 3/2013 |
| JP | 2013-536636 A | 9/2013 |
| JP | 2014-502819 A | 2/2014 |
| JP | 2014-138222 A | 7/2014 |

* cited by examiner

FIG.6 601

| NUMBER OF FEMTOs ACCOMODATED BY 1 GW | GROUP DIVISION COUNT | OFFSET VALUE (ms) |
|---|---|---|
| 5000 OR LESS | 0 (NO DIVISION) | SET BY MONITORING APPARATUS (0) |
| 5,000-10,000 | 1 (NO. OF GROUPS: 2) | SET BY MONITORING APPARATUS (50-500) |
| 10,000-15,000 | 2 (NO. OF GROUPS: 3) | |
| : | : | |
| 55,000-60,000 | 11 (NO. OF GROUPS: 12) | |

FIG.7 701

| CPU USAGE(%) 5 MIN. BEFORE CONFIGURATION | GROUP DIVISION COUNT | OFFSET VALUE (ms) |
|---|---|---|
| LESS THAN 10 | 0 (NO DIVISION) | 0 |
| 10 OR MORE AND LESS THAN 30 | 1 (NO. OF GROUPS: 2) | 50 |
| 30 OR MORE AND LESS THAN 50 | 2 (NO. OF GROUPS: 3) | 100 |
| : | : | : |
| 90 OR MORE AND LESS THAN 100 | 7 (NO. OF GROUPS: 8) | 500 |

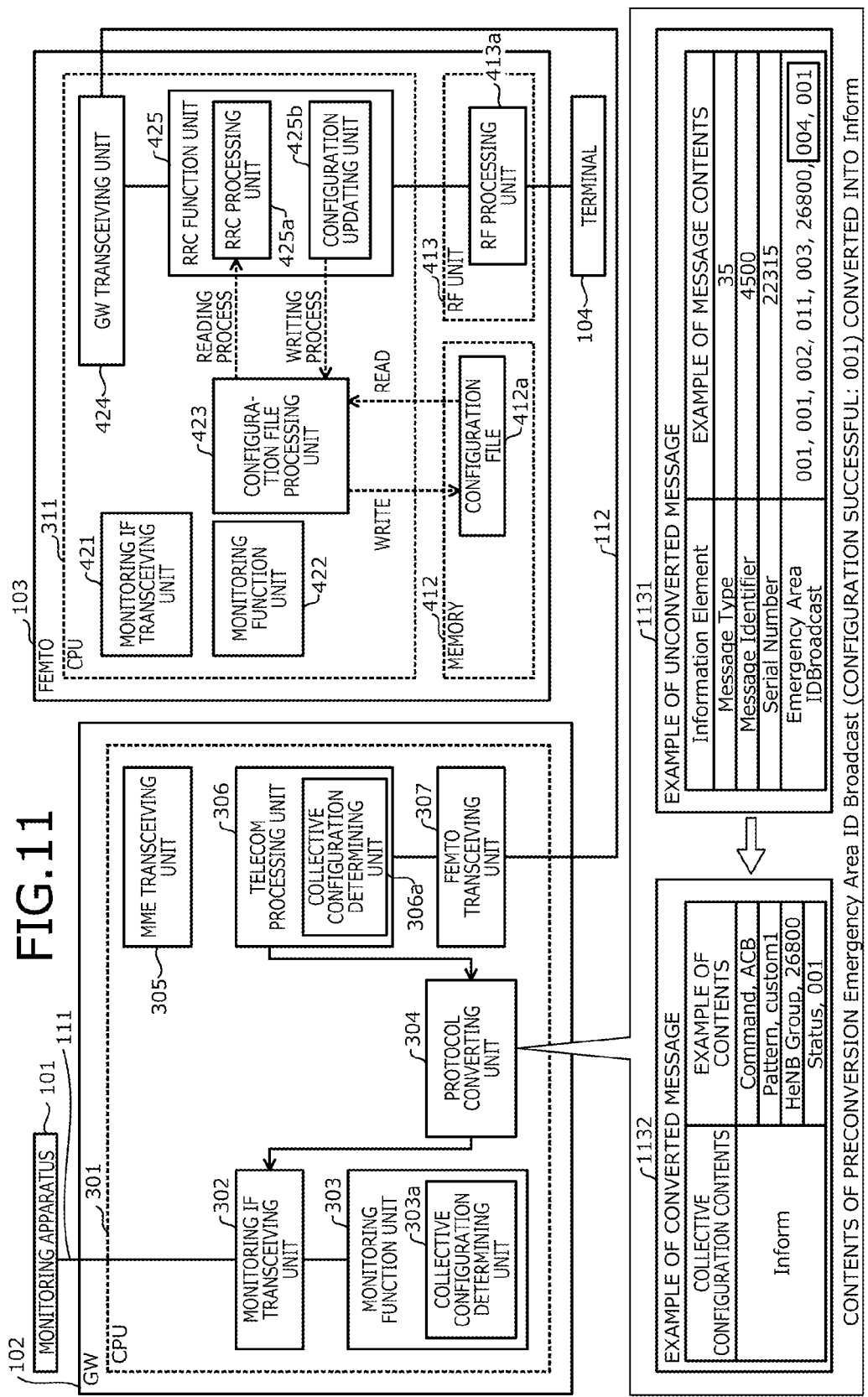

FIG.13

TR069: ACB CONTROL INFORMATION

| ITEM | CONTENTS |
|---|---|
| CellBarred | RESTRICTION CONTROL ON/OFF |
| BarringForEmergency | Access Class 10 FLAG |
| BarringForMO-SignalingONOFF | SIGNAL RESTRICTION ON/OFF |
| BarringForMO-Signaling-BarringFactor | EXTENT OF SIGNAL RESTRICTION |
| BarringForMO-Signaling-BarringTime | SIGNAL RESTRICTION TIME |
| BarringForMO-Signaling-BarringForSpecialAC | SIGNAL RESTRICTION FOR SPECIFIED CALL |
| BarringForMO-DataONOFF | DATA RESTRICTION ON/OFF |
| BarringForMO-Data-BarringFactor | EXTENT OF DATA RESTRICTION |
| BarringForMO-Data-BarringTime | DATA RESTRICTION TIME |
| BarringForMO-Data-BarringForSpecialAC | DATA RESTRICTION FOR SPECIFIED CALL |
| ssac-BarringForMMTEL-Voice-r9ONOFF | VOICE COMMUNICATON RESTRICTION ON/OFF |
| ssac-BarringForMMTEL-Voice-r9-BarringFactor | EXTENT OF VOICE COMMUNICATION RESTRICTION |
| ssac-BarringForMMTEL-Voice-r9-BarringTime | VOICE COMMUNICATION RESTRICTION TIME |
| ssac-BarringForMMTEL-Voice-r9-BarringForSpecialAC | VOICE COMMUNICATION RESTRICTION FOR SPECIFIED CALL |
| ssac-BarringForMMTEL-Video-r9ONOFF | VIDEO COMMUNICATON RESTRICTION ON/OFF |
| ssac-BarringForMMTEL-Video-r9-BarringFactor | EXTENT OF VIDEO COMMUNICATION RESTRICTION |
| ssac-BarringForMMTEL-Video-r9-BarringTime | VIDEO COMMUNICATION RESTRICTION TIME |
| ssac-BarringForMMTEL-Video-r9-BarringForSpecialAC | VIDEO COMMUNICATION RESTRICTION FOR SPECIFIED CALL |

FIG.14

S1AP: WRITE - REPLACE WARNING REQUEST

| IE | ORDINARY USE | USE IN EMBODIMENT (COLLECTIVE CALL RESTRICTION) |
|---|---|---|
| Message Type | SI MESSAGE IDENTIFIER | SI MESSAGE IDENTIFIER |
| Message Identifier | SET Warning MESSAGE (ETWS, CMAS) IDENTIFIER | SET RESERVED SPECIAL-VALUE (VALUE NOT USED FOR ORDINARY ETWS, CMAS) |
| Serial Number | | |
| Warning Message Contents | WARNING, ADVERTISEMENT NOTIFICATION INFORMATION | VARIOUS INFORMATION NECESSARY FOR ACB |

FIG.15

S1AP: WRITE - REPLACE WARNING RESPONSE

| IE | ORDINARY USE | USE IN EMBODIMENT (COLLECTIVE CALL RESTRICTION) |
|---|---|---|
| Message Type | SI MESSAGE IDENTIFIER | SI MESSAGE IDENTIFIER |
| Message Identifier | SET Warning MESSAGE (ETWS, CMAS) IDENTIFIER | S1AP: SET SAME VALUE AS VALUE RECEIVED BY WRITE-REPLACE WARING REQUEST |
| Serial Number | | |
| Broadcast Completed Area List | WARNING, ADVERTISING BROADCAST AREA | SET eNB ID OF FEMTO ITSELF |

FIG.16

S1AP: WRITE- REPLACE WARNING REQUEST

| IE | ORDINARY USE | USE IN COLLECTIVE CALL RESTRICTION |
|---|---|---|
| Message Type | SI MESSAGE IDENTIFIER | SAME AS ORDINARY |
| Message Identifier | SET Warning MESSAGE (ETWS, CMAS) IDENTIFIER | SAME AS ORDINARY |
| Serial Number | | |
| Warning Message Contents | WARNING, ADVERTISEMENT NOTIFICATION INFORMATION | SAME AS ORDINARY |
| ACB Info | - | ACB RESTRICTION INFORMATION |

FIG.17

S1AP: ACB REQUEST

| IE |
|---|
| Message Type |
| Message Identifier |
| Serial Number |
| Warning Message Contents |
| CellBarred |
| BarringForEmergency |
| BarringForMO-SignalingONOFF |
| BarringForMO-Signaling-BarringFactor |
| BarringForMO-Signaling-BarringTime |
| BarringForMO-Signaling-BarringForSpecialAC |
| BarringForMO-DataONOFF |
| BarringForMO-Data-BarringFactor |
| BarringForMO-Data-BarringTime |
| BarringForMO-Data-BarringForSpecialAC |
| ssac-BarringForMMTEL-Voice-r9ONOFF |
| ssac-BarringForMMTEL-Voice-r9-BarringFactor |
| ssac-BarringForMMTEL-Voice-r9-BarringTime |
| ssac-BarringForMMTEL-Voice-r9-BarringForSpecialAC |
| ssac-BarringForMMTEL-Video-r9ONOFF |
| ssac-BarringForMMTEL-Video-r9-BarringFactor |
| ssac-BarringForMMTEL-Video-r9-BarringTime |
| ssac-BarringForMMTEL-Video-r9-BarringForSpecialAC |

Rows 1–4: 1701
Rows 5–end: 1702

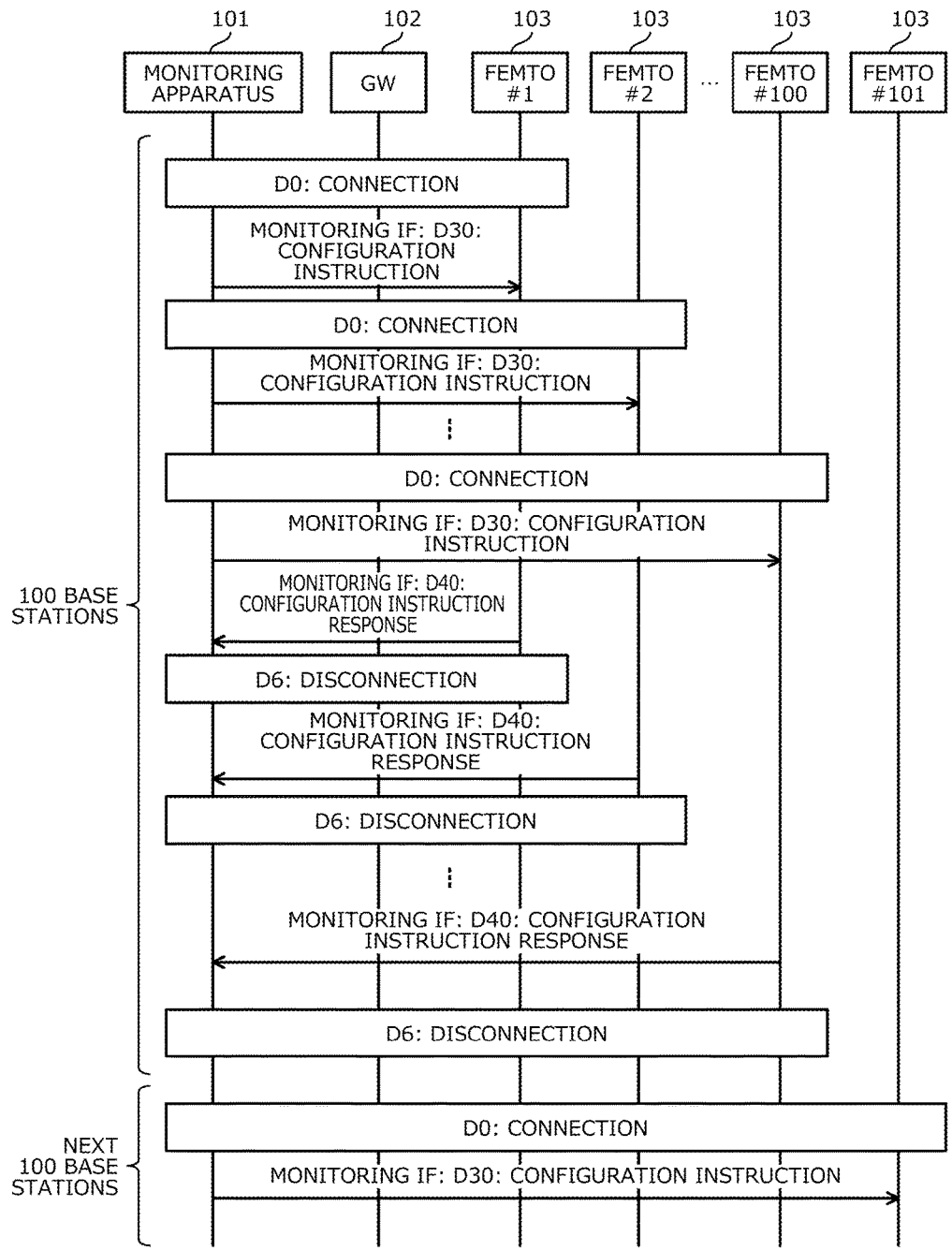

GATEWAY APPARATUS AND SYSTEM

CROSS REFERENCE TO RELATED APPLICATIONS

This application is a continuation application of International Application PCT/JP2015/064970, filed on May 25, 2015, and designating the U.S., the entire contents of which are incorporated herein by reference.

FIELD

The embodiments discussed herein relate to a gateway apparatus and a system.

BACKGROUND

A large number of femtocells, which are small base stations, are disposed and restriction of communication with mobile stations, etc. is configured for a large number of these base stations by using configuration information. These base stations are individually connected and controlled via a monitoring IF between a monitoring apparatus and the base stations. After the monitoring apparatus is connected with the individual base stations, monitoring configuration may be performed by transmitting the configuration information. The multiple base stations are continually connected to a gateway apparatus via a call control I/F so as to perform call control communications.

In a conventional technique, service bearers are established for respective access points between the mobile stations and the gateway apparatus to restrict communications according to types of the service bearers (see, e.g., Japanese Laid-Open Patent Publication No. 2012-119826). In another technique, to prevent an overload of a network (base stations), Access Class Barring (ACB) information is used as the configuration information for access restriction so as to place restrictions on communication of a terminal (see, e.g., Published Japanese-Translation of PCT Application, Publication No. 2013-536636). In another technique, a terminal is notified of a broadcast message by using ACB information for a certain service so as to restrict communications (see, e.g., Published Japanese-Translation of PCT Application, Publication No. 2012-529806).

In another technique, access restrictions are placed on mobile stations based on a network state so as to prevent network congestion (see, e.g., Published Japanese-Translation of PCT Application, Publication No. 2014-502819, Japanese Laid-Open Patent Publication No. 2012-39366, and Published Japanese-Translation of PCT Application, Publication No. 2013-507809).

SUMMARY

According to an aspect of an embodiment, a gateway apparatus includes a first inter-device interface configured to communicate with a monitoring apparatus; a second inter-device interface configured to communicate with multiple subordinate base station apparatuses; a memory; and a processor coupled to the memory. The processor is configured to generate first configuration information when second configuration information is received from the monitoring apparatus via the first inter-device interface. The processor generates the first configuration information by performing protocol conversion of converting the second configuration information into a format adapted to the second inter-device interface for the multiple base station apparatuses. The processor is further configured to transmit the generated first configuration information to the multiple base station apparatuses via the second inter-device interface, and divide the multiple base station apparatuses into predetermined groups. The processor transmits the first configuration information to the multiple base station apparatuses at a different timing for each of the groups.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 6 and 7 are tables depicting configuration contents used for group division of base stations by the gateway apparatus according to the embodiment;

FIG. 11 is a diagram for explaining reception of a configuration instruction response from the base station by the gateway apparatus according to the embodiment;

FIG. 13 is a table of a list of parameters and item contents of control information of ACB used in TR069 IF serving as a monitoring IF in the system according to the embodiment;

FIG. 14 is a table of an example of mapping of a collective configuration request to an S1 message according to the gateway apparatus of the embodiment;

FIG. 15 is a table of an example of mapping of a configuration request response using the S1 message from the base station to the GW according to the embodiment;

FIG. 16 is a table of another example of mapping of a collective configuration request to an S1 message according to the gateway apparatus of the embodiment;

FIG. 17 is a table of an example of an S1 message according to the gateway apparatus of the embodiment;

FIG. 19 is a sequence diagram of procedures of configuration instructions to multiple base stations according to an existing technique.

DESCRIPTION OF THE INVENTION

An embodiment of a disclosed technique will be described in detail with reference to the accompanying drawings. In the embodiment, an overall configuration of a system will be described.

First, matters related to the conventional techniques will be discussed. With the conventional techniques, a monitoring apparatus cannot simultaneously notify multiple base stations of configuration information for communication restriction. For example, when an unexpected disaster occurs, it is necessary to urgently notify tens of thousands of base stations of information regarding communication restriction to restrict communications between terminals and the base stations; however, this cannot be achieved.

To allow the monitoring apparatus to give notification of the configuration information for communication restriction via a monitoring IF, the notification of the configuration information must be performed after a connection start process is sequentially executed for each of the base stations and then the notification is followed by a disconnection process at the end of communication. Therefore, the monitoring apparatus cannot simultaneously notify the base stations of the information of communication restriction and requires a longer time when the number of the base stations is larger. The monitoring apparatus cannot concurrently process simultaneous responses from a large number of the base stations. Although the processing capacity may be increased by increasing monitoring apparatuses (servers), this leads to increased costs. Although parallel processing using the monitoring IF may be achieved by improving the processing capacity, a large number of the base stations cannot simultaneously be notified of the configuration information due to the communication start process and the communication end process.

When configuration includes a large number (e.g., several tens of thousands) of base stations and the monitoring apparatus notifies a large number of the base stations of the configuration information, if the monitoring apparatus executes a high-load process triggered by an occurrence of emergency such as a disaster, a reception process may not be executed for simultaneous responses from the base stations. In this case, the monitoring apparatus may cause a delay in retransmission to the base station to which the transfer of the configuration information has failed or delay in notification of a result to a network administrator. As a result, rapid configuration instructions required at the time of an emergency such as an occurrence of a disaster may not be performed.

Figure 1:
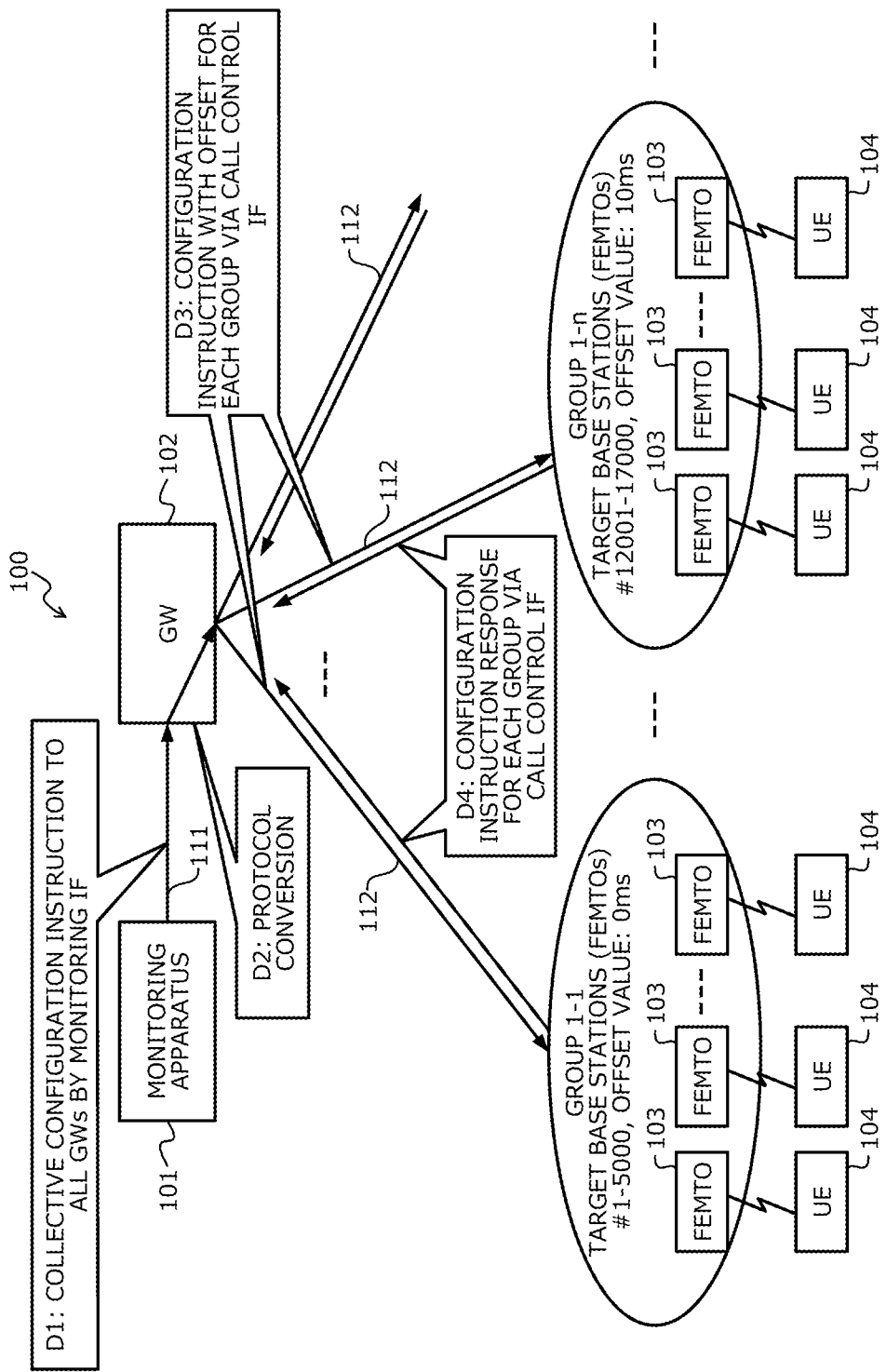
FIG. 1 is a block diagram of an overall configuration of a system including a gateway apparatus according to an embodiment.

FIG. 1 is a block diagram of an overall configuration of a system including a gateway apparatus according to the present embodiment. A system 100 includes a monitoring apparatus 101, a gateway apparatus (GW) 102, small base station apparatuses (hereinafter referred to as base stations, Femtos) 103, and terminals (UEs) 104 present in communication regions of the base stations 103.

Although not depicted in FIG. 1, the overall configuration of the system may include a host apparatus of the gateway apparatus 102. Examples of the host apparatus of the gateway apparatus 102 include Mobility Management Entity (MME), Serving-Gateway (S-GW), etc.

The GW 102 of the embodiment aggregates communications between the Femtos 103 and nodes on a core network to reduce a load of call communications applied to the core network by the Femtos 103. Since call control communications by a call control IF 112 are performed between the GW 102 and the Femtos 103, the call control IF 112 is continually connected between the GW 102 and the Femtos 103. A message for reporting a disaster, etc. is simultaneously sent to the terminals 104 in a short time via the call control IF 112. Examples of the message include Earthquake and Tsunami Warning System (ETWS) and Commercial Mobile Alert System (CMAS).

By using a monitoring IF 111 that is a first inter-device interface, the monitoring apparatus 101 transmits to the GW 102, a collective configuration instruction D1 for the base stations 103 monitored by the monitoring apparatus 101. The collective configuration instruction D1 is configuration information including messages of communication restriction, disaster information, etc. for all the base stations 103 monitored by the monitoring apparatus 101, for example.

The monitoring apparatus 101 executes processing for connection processes (connection start and disconnection) for the GW 102 via the monitoring IF 111 for communication with the GW 102. It is noted that some of the GWs 102 may be specified as a group out of all the GWs 102 monitored by the monitoring apparatus 101 and that an area may be specified for transmitting the collective configuration instruction D1.

When receiving the collective configuration instruction D1 from the monitoring apparatus 101, the GW 102 converts a message indicating communication restriction, etc. included in the collective configuration instruction D1 into a call control protocol (a process D2 of the GW 102). The GW 102 then transmits a configuration instruction (configuration information) D3 including the message of communication restriction converted according to the converted call control protocol, in all the base stations 103 via a call control IF 112 that is a second inter-device interface.

The GW 102 divides the base stations 103 into groups in advance and transmits the configuration instruction D3 at a different time (offset value) for each of the groups. The group division is performed based on, for example, the number of groups corresponding to the number of the base stations 103 accommodated by the one GW 102, or the number of groups corresponding to a load state of the GW 102. The offset value is set to a different value for each of the groups, and the GW 102 transmits the configuration instruction D3 at a different timing for each of the groups based on the offset value.

In the example of FIG. 1, the group division is performed according to the number of the base stations 103 accommodated by the GW 102, and a group 1-1 of 5000 base stations (#1 to #5000) 103 and a group 1-n of 5000 base stations (#12001 to #17000) 103 are included in the example. It is noted that # indicates a unique number (identifier) of each of the base stations 103. The group division may be performed based on the unique numbers (identifiers) of the respective base stations 103 for each area, or may be performed by delimiting a range of the unique numbers (identifiers) of the respective base stations 103 regardless of the installation locations of the base stations 103.

The offset value is 0 ms for the group 1-1 and 10 ms for the group 1-n. In this case, the configuration instruction D3 is a configuration instruction transmitted to the group 1-1 and to the group 1-n 10 ms thereafter. As a result, the base stations 103 receive the configuration instruction D3 at different timings according to group and at different timings according to group, transmit to the GW 120, a configuration instruction response D4 for the configuration instruction D3.

The GW 102 and the base stations 103 are continually connected via, for example, an S1 interface serving as the call control IF 112 and exchange S1 messages. As a result, the monitoring apparatus 101 may transmit the message of the configuration instruction D3 for communication restriction, etc. through the GW 102 to the base stations 103 in all the groups by transmitting the collective configuration instruction D1 only once.

The base station 103 may restrict the communications between the base stations 103 and the UEs 104 by notifying the UEs 104 of the message of communication restriction.

Figure 2:
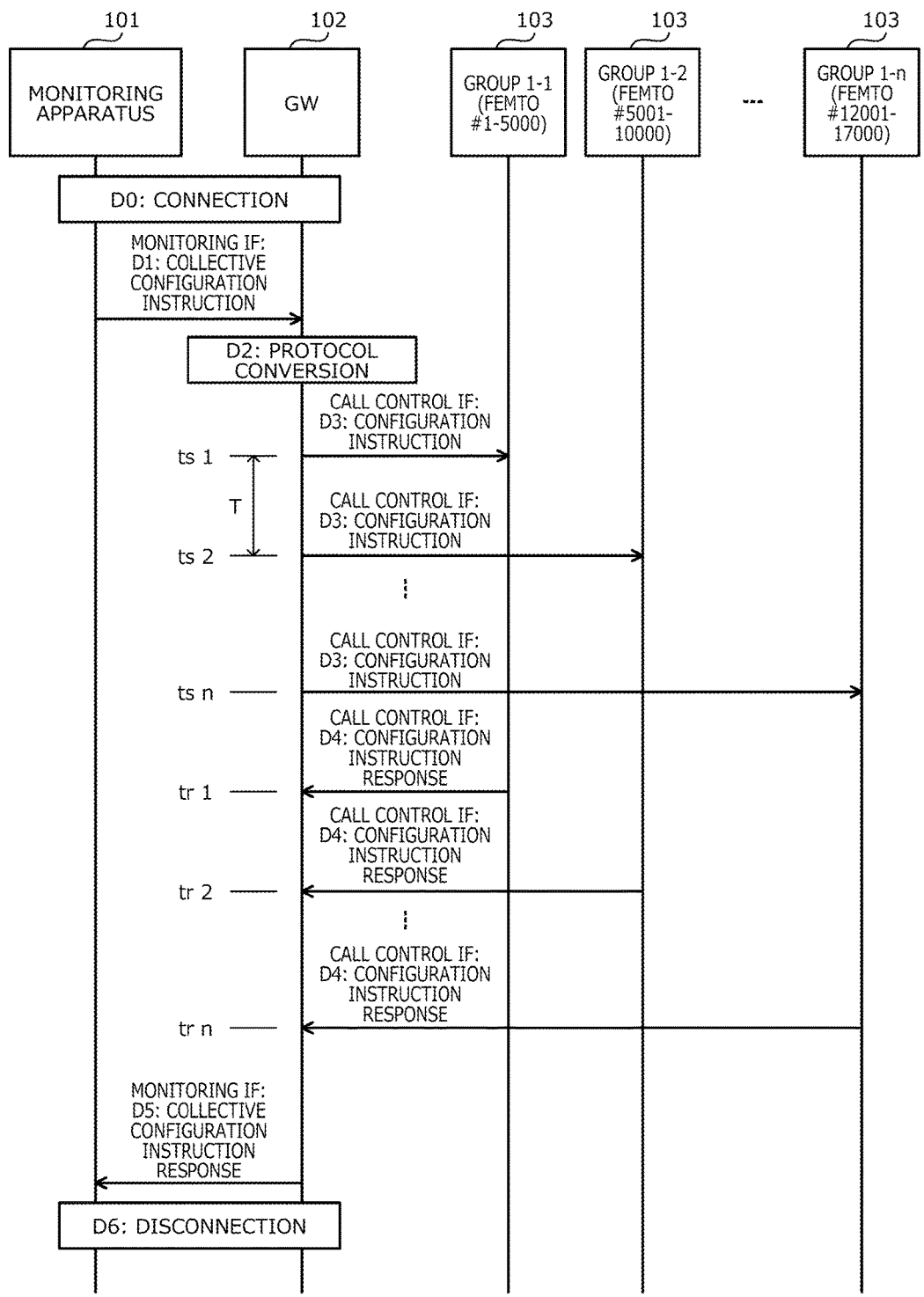
FIG. 2 is a sequence diagram of an overview of processing in the overall system including the gateway apparatus according to the embodiment.

FIG. 2 is a sequence diagram of an overview of processing in the overall system including the gateway apparatus according to the embodiment. Exchanges of information between the monitoring apparatus 101, the GW 102, and the base stations 103 will be described with reference to FIG. 2. In the embodiment, the monitoring apparatus 101 transmits and receives messages with respect to the Femtos 103 by using the call control IF 112 via the GW 102.

First, the monitoring apparatus 101 executes a connection establishment process D0 (connection start) with the GW 102 via the monitoring IF 111, and the monitoring apparatus 101 designates the base stations 103 that are to be collective configuration subjects and transmits the collective configuration instruction D1. The GW 102 receiving the collective configuration instruction D1 from the monitoring apparatus 101 executes the protocol conversion process D2 of converting the collective configuration instruction D1 described in the protocol of the monitoring IF 111 into the protocol of the call control IF 112 for the base stations 103. The GW 102 then transmits the configuration instruction D3 via the call control IF 112 to each of the base stations 103 designated as the collective configuration subjects in the collective configuration instruction D1 after the protocol conversion. In this case, the GW 102 transmits the configuration instruction D3 at a different timing for each group based on the offset value of each group.

The monitoring apparatus 101 does not have the call control IF 112 and transmits the collective configuration instruction D1 to the GW 102 via the monitoring IF 111. The GW 102 then transmits the configuration instruction D3 to the base stations 103 designated as the collective configuration subjects, based on the offset value of each group.

When completing the configuration based on the configuration instruction D3, the base stations 103 receiving the configuration instruction from the GW 102 each transmits to the GW 102 via the call control IF 112, the configuration instruction response D4 as response information indicating the configuration state based on the configuration instruction D3.

As described above, since the configuration instruction D3 is sent at a different timing for each group of the base stations 103, the configuration instruction response D4 is also transmitted to the GW 102 at a different timing for each group of the base stations 103. The base stations 103 are configured to transmit the configuration instruction response D4 to the GW 102, based on the received configuration instruction D3 and the base stations 103 provide no special control on the timing of transmission of the configuration instruction response D4.

The base stations 103 may transmit the configuration instruction D3 to the terminals 104 and the terminals 104 may determine whether to perform the communication configuration based on the configuration instruction D3. In this case, the base stations 103 use determination results (whether configuration is performed, or whether configuration is successful or failed) by the terminals 104 as the configuration instruction responses D4. Upon completion of the configuration process based on the configuration instruction D3, the base stations 103 each transmits the configuration instruction response D4 to the GW 102.

The GW 102 receives, at timings differing according to group, the configuration instruction responses D4 from the base stations 103 designated as the collective configuration subjects. When receiving the configuration instruction responses D4 or when a collective configuration response waiting timer of the GW 102 expires, the GW 102 collects the configuration instruction responses D4 to generate one collective configuration instruction response D5. The GW 102 then transmits the collective configuration instruction response D5 via the monitoring IF 111 to the monitoring apparatus 101. Subsequently, the monitoring apparatus 101 performs a disconnection process D6 through the monitoring IF 111 between the GW 102 and the monitoring apparatus 101 and terminates a series of operations related to collective configuration.

In the process described above, the monitoring apparatus 101 may perform collective configuration for communication restriction, etc. with respect to the multiple base stations 103 by executing the connection processes (connection D0 and disconnection D6) only once for the GW 102.

In a distributed manner, the GW 102 sends the configuration instruction D3 to the multiple base stations 103 designated as the collective configuration subjects, at timings differing according to group. In the example of FIG. 2, the GW 102 first transmits the configuration instruction D3 to the group 1-1 at timing ts1, subsequently transmits the configuration instruction D3 to the group 1-2 at timing ts2, and subsequently transmits the configuration instruction D3 to the group 1-n at timing tsn. A period between the adjacent timings ts1, ts2 corresponds to the offset value T.

As a result, the GW 102 may receive from the multiple base stations 103, the configuration instruction response D4 in a distributed manner, at a different timing for each group. In the example of FIG. 2, the GW 102 first receives the configuration instruction response D4 from the group 1-1 at timing tr1, subsequently receives the configuration instruction response D4 from the group 1-2 at the timing tr2, and subsequently receives the configuration instruction response D4 from the group 1-n at timing trn. In this way, the GW 102 may distribute the processes related to the transmission of the configuration instruction D3 to and the reception of the configuration instruction response D4 from the multiple base stations 103. Although FIG. 2 depicts an example of receiving the configuration instruction response D4 from the group 1-1 at the timing tr1 after the timing tsn of transmission of the configuration instruction D3 to the group 1-n, the present invention is not limited hereto and the transmission and reception timings for the groups may be intermixed.

As a result, even when the number of the base stations 103 designated as the collective configuration subjects becomes large (e.g., several tens of thousands), the GW 102 may smoothly execute the processes related to the transmission of the configuration instruction D3 and the reception of the configuration instruction response D4 for a large number of the base stations 103 and may prevent congestion in the GW 102. For example, even if the GW 102 is executing a high-load process triggered by an emergency such as an occurrence of a disaster, the GW 102 receives the configuration instruction responses D4 in a distributed manner from the base stations 103, for each group and therefore, may execute the process related to reception of the instruction responses D4. As a result, delays in retransmission to the base stations 103 after failure of transmission of the configuration instruction D3 and in the notification of a result to the network administrator may be prevented, so that rapid configuration instructions required at the time of an emergency such as an occurrence of a disaster may be performed.

Figure 3:
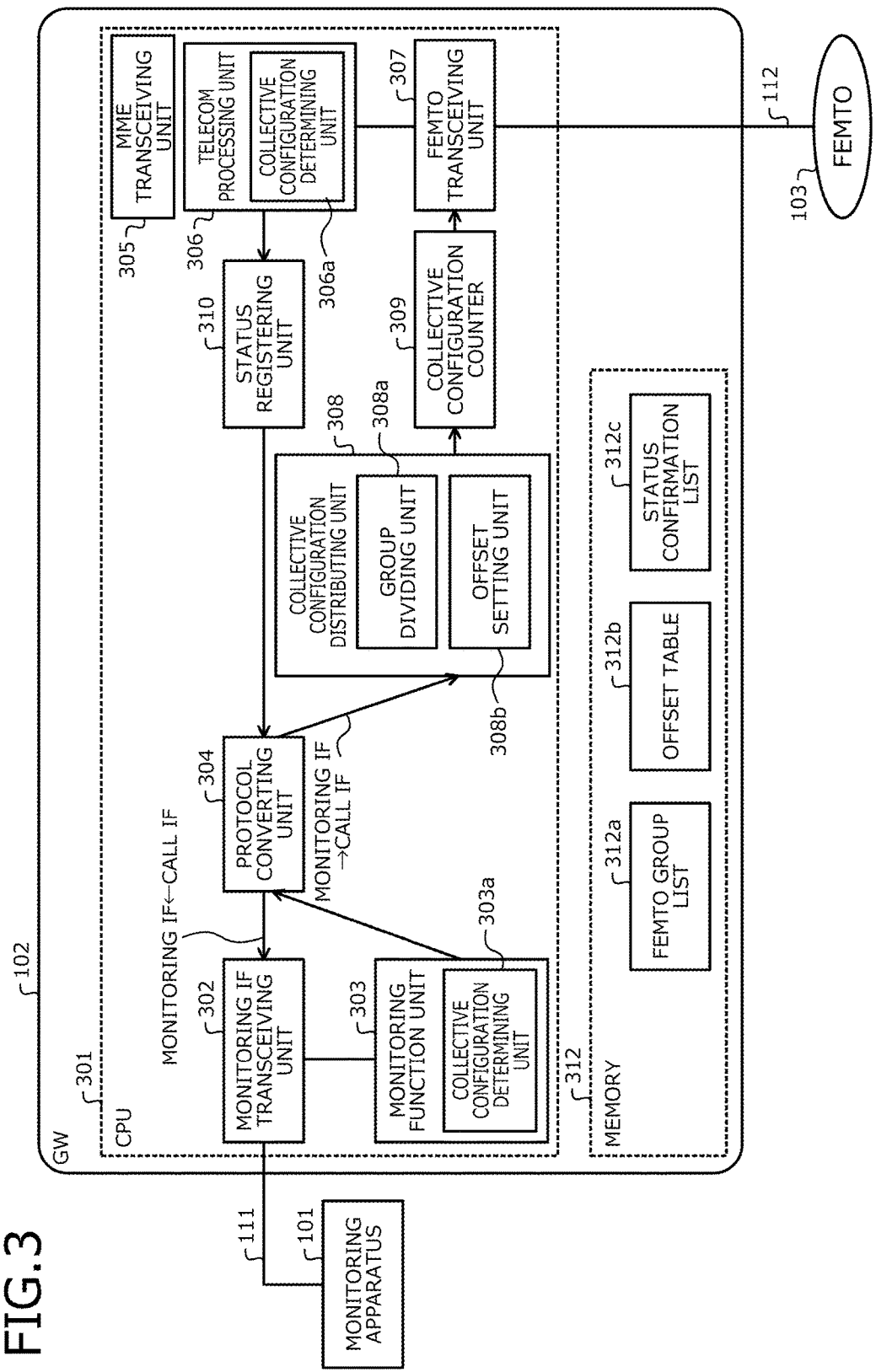
FIG. 3 is a block diagram of a configuration example of the gateway apparatus according to the embodiment.

FIG. 3 is a block diagram of a configuration example of the gateway apparatus according to the embodiment. The GW 102 includes a control unit (CPU) 301 and a memory (such as a ROM and a RAM) 312 and the CPU 301 executes a program stored in the memory 312 such as a ROM to control the operation of the GW 102. In this case, the RAM is used as a data area for processing work.

The GW 102 includes a monitoring IF transceiving unit 302, a monitoring function unit 303, a protocol converting unit 304, an MME transceiving unit 305, a telecom processing unit 306, a Femto transceiving unit 307, a collective configuration distributing unit 308, a collective configuration counter 309, and a status registering unit 310.

The monitoring IF transceiving unit 302 is an IF for transmission to and reception from the monitoring apparatus 101 via the monitoring IF 111. The telecom processing unit 306 includes a collective configuration determining unit 306a.

The monitoring function unit 303 includes a collective configuration determining unit 303a configured to determine whether the monitoring IF transceiving unit 302 has received the collective configuration instruction D1 from the monitoring apparatus 101. The collective configuration determining unit 303a decodes a received message and determines whether the message is a message that used the existing monitoring IF 111 or a message for collective configuration (the collective configuration instruction D1). The collective configuration determining unit 303a outputs the collective configuration instruction D1 to the protocol converting unit 304.

The protocol converting unit 304 converts the collective configuration instruction D1 received via the monitoring IF 111 into a message to be used by the call control IF 112. Through the protocol conversion D2 by the protocol converting unit 304, the configuration instruction D3 for the base stations 103 is generated and output to the Femto transceiving unit 307.

The protocol converting unit 304 converts the collective configuration instruction D1 received via the monitoring IF 111 into communication restriction information (ACB) used between the general-purpose terminals 104 and the Femtos 103 by the call control IF 112 or a message indicating a change in Tracking Area Code (TAC). The collective configuration instruction D1 post protocol conversion is output to the collective configuration distributing unit 308. These message conversion examples will be described later. The protocol converting unit 304 also converts a configuration result included in the configuration instruction response D4 received, via the call control IF 112, from the Femto 103 into a message of the monitoring IF 111 and outputs the message to the monitoring IF transceiving unit 302.

The collective configuration instruction D1 may be received from an upper core node such as an MME connected to the GW 102, or the collective configuration instruction D1 may be received via the MME transceiving unit 305.

The collective configuration distributing unit 308 includes a group dividing unit 308a and an offset setting unit 308b. The collective configuration distributing unit 308 divides the collective configuration instruction D1 into multiple groups to generate the configuration instruction D3 for each group, and transmits the configuration instruction D3 to the Femtos 103 at a different timing (in a distributed manner) for each group.

For example, the group dividing unit 308a divides the Femtos 103 accommodated by the GW 102 into multiple groups. The group dividing unit 308a performs the group division by referring to a group division setting table and records information of the group division to a Femto group list 312a in the memory 312. The offset setting unit 308b obtains an offset value T corresponding to the number of groups by referring to the group division setting table and records the value to an offset table 312b in the memory 312.

The collective configuration counter 309 refers to the Femto group list 312a and the offset table 312b in the memory 312 to count a time period corresponding to the offset value T for each group and sends the configuration instruction D3 to the Femto transceiving unit 307 at a different timing for each group.

The Femto transceiving unit 307 transmits to the multiple Femtos 103 included in each group, the configuration instruction D3 for the group via the call control IF 112. The Femto transceiving unit 307 receives the configuration instruction responses D4 from the multiple Femtos 103 included in each group via the call control IF 112.

The collective configuration determining unit 306a of the telecom processing unit 306 outputs the configuration instruction responses D4 to the protocol converting unit 304. The protocol converting unit 304 applies the protocol conversion D2 of the monitoring IF 111 to the configuration instruction responses D4. The collective configuration determining unit 306a distinguishes S1 messages for MME and the message of the configuration instruction responses D4. The configuration instruction responses D4 for which the protocol conversion is performed are stored by the monitoring IF transceiving unit 302 and transmitted via the monitoring IF 111 to the monitoring apparatus 101.

The status registering unit 310 registers a configuration result included in the message of the configuration instruction responses D4 returned from the Femtos 103 in response to the configuration instruction D3, into a status confirmation list 312c in the memory 312. The configuration results are configuration results of configuration by the UEs 104 based on the configuration instruction D3 and is received by the GW 102 via the Femtos 103. The GW 102 transmits the status confirmation list 312c to the monitoring apparatus 101 after the configuration instruction responses D4 are returned from all the Femtos 103 designated as the collective configuration subjects.

Additionally, the status registering unit 310 may transmit to the monitoring apparatus 101, success/failure information linked to the ID of the Femto 103 returning a response, as the configuration instruction response D4. For example, configuration success/configuration failure of each of the Femtos 103 in a certain group may be transmitted as a list as follows:

Femto 1: 80UE success

Femto 2: 24UE success.

As described above, since the configuration instruction D3 is transmitted to the Femtos 103 at a different timing for each group, the Femtos 103 transmit the configuration instruction response D4 to the GW 102 at a different timing for each group. As a result, the GW 102 may receive the configuration instruction response D4 from the Femtos 103 at a different timing for each group and may process the responses in a distributed manner in terms of timing. In particularly, the GW 102 may be prevented from receiving a large amount of the configuration instruction responses D4 at a same timing from a large number of the Femtos 103. As a result, the processing burden may be reduced at the telecom processing unit 306 (the collective configuration determining unit 306a) and the protocol converting unit 304, which are particularly burdened in the GW 102.

Figure 4:
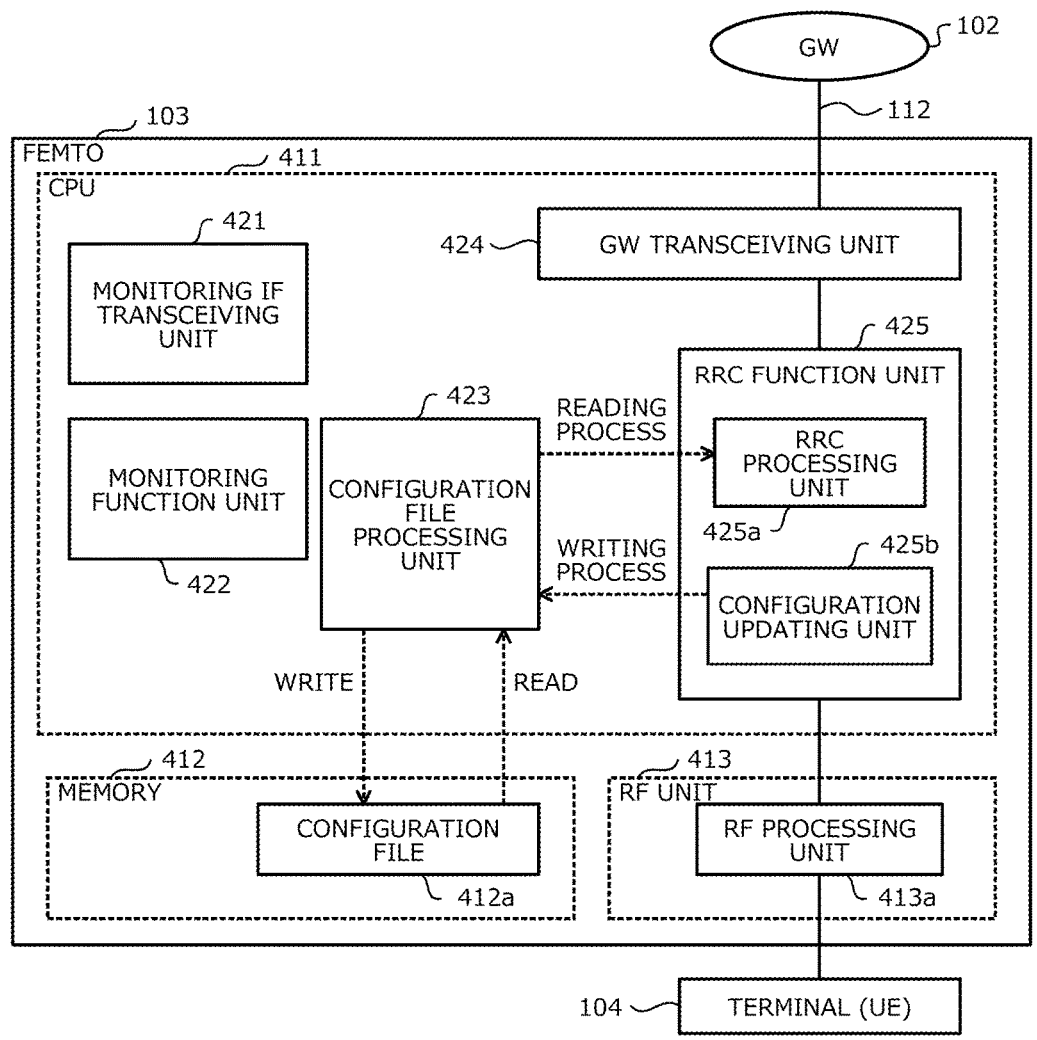
FIG. 4 is a block diagram of a configuration example of a base station of the system according to the embodiment.

FIG. 4 is a block diagram of a configuration example of the base station of the system according to the embodiment. The base station (Femto) 103 includes a control unit (CPU) 411, a memory 412, and an RF unit 413. The CPU 411 executes a program stored in a ROM not depicted to control the operation of the Femto 103. In this case, the RAM is used as a data area for processing work.

The CPU 411 includes a monitoring IF transceiving unit 421, a monitoring function unit 422, a configuration file processing unit 423, a GW transceiving unit 424, and an RRC function unit 425. The monitoring IF transceiving unit 421 and the monitoring function unit 422 execute processing related to existing monitoring processes transmitted from the monitoring apparatus 101 (not involved in the collective configuration process in the embodiment).

The GW transceiving unit 424 receives the configuration instruction D3 via the call control IF 112 from the GW 102 (the Femto transceiving unit 307) and outputs the instruction to the RRC function unit 425.

The radio resource control (RRC) function unit 425 includes an RRC processing unit 425a and a configuration updating unit 425b. The configuration updating unit 425b writes the configuration contents of the configuration instruction D3 received from the GW 102 into a configuration file 412a in the memory 412. The RRC processing unit 425a reads the configuration file 412a, creates a transmission message to the terminal (UE) 104, and transmits the message to the terminal 104 via an RF processing unit 413a of the RF unit 413.

Figure 5:
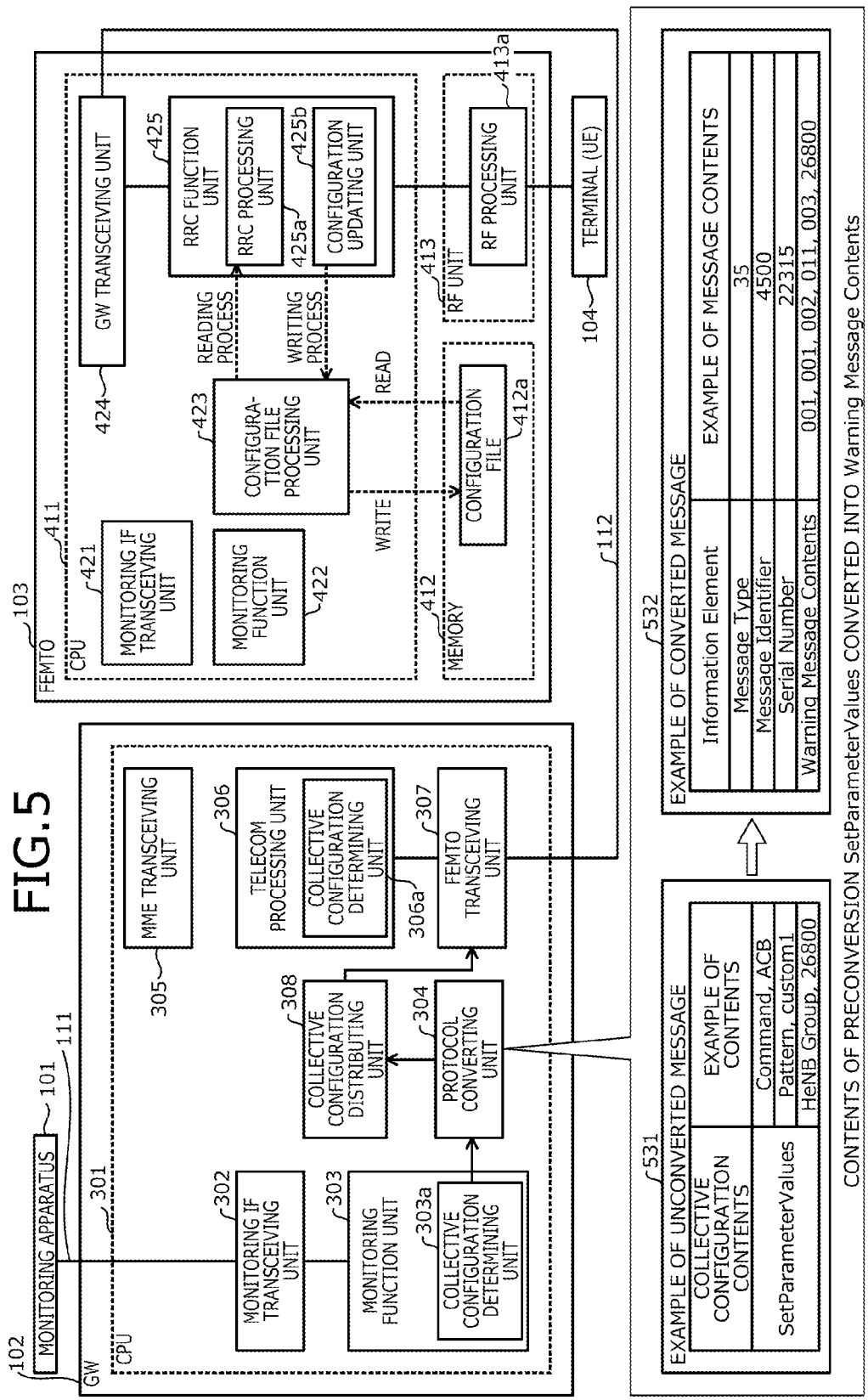
FIG. 5 is a diagram for explaining transmission of a configuration instruction from the gateway apparatus to the base station according to the embodiment.

FIG. 5 is a diagram for explaining transmission of a configuration instruction from the gateway apparatus to the base station according to the embodiment. An exemplary protocol conversion performed by the protocol converting unit 304 is also depicted. In an example described below, the base station 103 is a Femto. The Fermtos 103 in a target group receiving the collective configuration instruction D1 (the configuration instruction D3) restricts communications with the terminals 104.

In the monitoring apparatus 101 and the GW 102, messages to be sent/received (the collective configuration instruction D1, etc.) are defined and shared in advance.

The collective configuration determining unit 303a of the monitoring function unit 303 determines whether the received message is a message using the existing monitoring IF 111 or a message for collective configuration (the collective configuration instruction D1), and outputs the collective configuration instruction D1 to the protocol converting unit 304.

The protocol converting unit 304 converts the collective configuration instruction D1 received via the monitoring IF 111 into a message to be used by the call control IF 112 and thereby generates the configuration instruction D3 for the base stations 103 and outputs the instruction to the Femto transceiving unit 307.

The Femto transceiving unit 307 transmits to the Femtos 103 of each group via the call control IF 112, the configuration instruction D3 post protocol conversion.

In the Femto 103, the GW transceiving unit 424 receives the configuration instruction D3 from the GW 102 (the Femto transceiving unit 307) via the call control IF 112 and outputs the instruction to the RRC function unit 425.

The configuration updating unit 425b of the RRC function unit 425 writes the configuration contents of the configuration instruction D3 received from GW 102 into the configuration file 412a in the memory 412. The RRC processing unit 425a reads the configuration file 412a, creates a transmission message to the terminal 104, and transmits the message to the terminal 104 via the RF processing unit 413a of the RF unit 413.

Based on this transmission message to the terminal 104 (corresponding to the collective configuration instruction D1 of the monitoring apparatus 101), the terminal 104 restricts communications with the Femto 103.

An unconverted message 531 depicted in FIG. 5 is a message of the collective configuration instruction D1 used in the protocol of the monitoring IF 111, and a converted message 532 is a message of the configuration instruction D3 used in the protocol of the call control IF 112. The contents of SetParametererValues in the unconverted message 531 are converted to Warning Messages Contents in the converted message 532.

In the example of FIG. 5, three parameters (collective configuration content, target area information, and configuration pattern) of communication restriction indicated by the collective configuration instruction D1 are stored in the Warning Messages Contents of the converted message 532. In this parameter conversion, command and ACB information indicating the collective configuration content of the unconverted message (the collective configuration instruction D1) are converted to 001, 01. Pattern, custom 1 indicative of the configuration pattern is converted to 002, 011. HeNB Group, 26800 indicative of the target area information is converted to 003, 26800.

In the Femto 103 receiving the message of the configuration instruction D3 transmitted by the GW 102, the configuration updating unit 425b writes the message of the configuration instruction D3 into the configuration file 412a. The RRC function unit 425 reads the configuration file 412a to create and transmit a transmission message to the terminal (UE) 104 that is the end user. When the configuration is reflected only in the configuration file for the Femto 103, the RF processing unit 413a does not function.

FIGS. 6 and 7 are tables depicting configuration contents used for group division of base stations by the gateway apparatus according to the embodiment. FIGS. 6 and 7 correspond to the setting tables referred to when the collective configuration distributing unit 308 (the group dividing unit 308a, the offset setting unit 308b) of the GW 102 operates.

The group dividing unit 308a of the GW 102 performs "A: group division based on accommodation number" described in a setting table 601 of FIG. 6, or "B: group division based on load of GW" described in a setting table 701 of FIG. 7, or "C: no group division", under the control of the monitoring apparatus 101. The offset setting unit 308b sets the offset value T corresponding to a division count. It is noted that the group division is not limited to the division based on the A and B and may be performed by various methods such as division based on communication speed (between the GW 102 and the terminal 104) and communication quality (SNR, CNR, etc.) of the call control IF 112, for example.

FIG. 6 depicts the setting table 601 when group division is performed based on the accommodation number of the Femtos 103 accommodated by the GW 102. When the GW 102 performs "A: group division based on accommodation number", the group dividing unit 308a determines a group division count based on the number of the Femtos 103 call-connected to the GW 102 depicted in FIG. 6. For example, when the accommodation number is 11,000, two groups of the 5,000 Femtos 103 and one group of the 1,000 Femtos 103 are created by referring to FIG. 6.

The offset value T corresponding to the group division count is set by the monitoring apparatus 101. For example, the offset value T in the case of no division is 0 ms, and the offset value T in the case of the division count 1 (two groups) is a value of 50 ms to 500 ms.

The group dividing unit 308a determines groups to which the multiple Femtos 103 belong (see FIG. 1) based on the group division count and records information of the Femtos 103 in each group into the Femto group list 312a in the memory 312. The offset setting unit 308b records the offset value T to the offset table 312b.

FIG. 7 depicts the setting table 701 when group division is performed based on the load of the GW 102. When performing "B: group division based on load of GW", the GW 102 determines the group division count corresponding to an average CPU usage rate depicted in FIG. 7, for example. In this case, the group dividing unit 308a performs the group division by obtaining the average CPU usage rate for a five-minute period before transmitting the configuration instruction D3. For the average CPU usage rate (CPU load), the group dividing unit 308a collects performance data of the CPU 301 every five minutes, for example.

The offset setting unit 308b sets the offset value T corresponding to the determined division count. In the example of FIG. 7, when the CPU value (average CPU usage rate) is less than 10%, the group division count is zero (no division) and the offset value T is 0 ms; when the CPU value is 10% or more and less than 30%, the group division count is one (two groups) and the offset value T is 50 ms; and when the CPU value is 90% or more and less than 100%, the group division count is seven (eight groups) and the offset value T is 500 ms. For example, when the current CPU value is 45%, the group division count is two (the number of groups is three) and the offset value T is 100 ms.

When load is not to be placed on the GW 102, the offset value T is set to a large value. By making the offset value T larger as the CPU value increases as depicted in FIG. 7, the CPU load may be reduced. However, a larger offset value leads to a longer time required for transmitting all the configuration instructions D3 for all the Femtos 103 designated as the collective configuration subjects (time required for receiving the configuration instruction responses D4).

Figure 8:
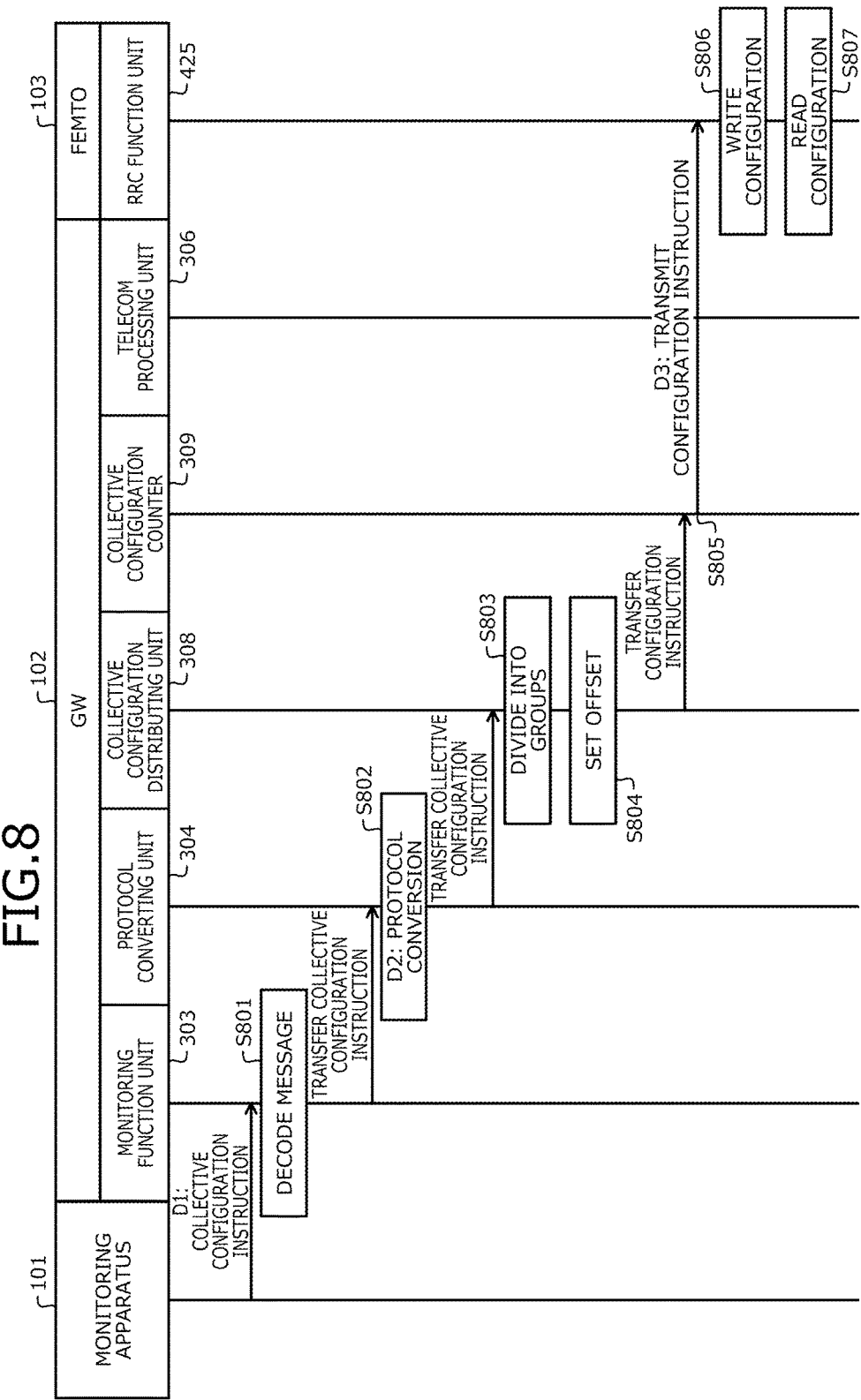
FIG. 8 is a sequence diagram of process procedures for a configuration instruction of the overall system according to the embodiment.

FIG. 8 is a sequence diagram of process procedures for a configuration instruction of the overall system according to the embodiment. The collective configuration instruction D1 transmitted from the monitoring apparatus 101 is received by the monitoring function unit 303 of the GW 102 and the monitoring function unit 303 performs message decoding (step S801). In the case of the collective configuration instruction D1, the monitoring function unit 303 transfers the collective configuration instruction D1 to the protocol converting unit 304, and the protocol converting unit 304 performs the protocol conversion process D2 for the collective configuration instruction D1 (step S802) and transfers the collective configuration instruction D1 post protocol conversion to the collective configuration distributing unit 308.

In the collective configuration distributing unit 308, the group dividing unit 308a divides the collective configuration instruction D1 into the group configuration instructions D3 of respective groups (step S803). In this case, as described above, the group dividing unit 308a divides the Femtos 103 into multiple groups. Additionally, the offset setting unit 308b sets the offset value T corresponding to the number of groups (step S804). As a result, the configuration instructions D3 are transmitted multiple times to the terminals 104 with the offset value T set according to the number of the divided groups.

The contents of the configuration instructions D3 are the same as the contents of the collective configuration instruction D1, and the configuration instructions D3 mean that the configuration contents indicated by the collective configuration instruction D1 are transmitted multiple times to the respective groups.

The collective configuration counter 309 counts a time period for each group (the Femtos 103) according to the offset value T and sends the multiple configuration instructions D3 at different timings according to group (step S805, see FIG. 1).

In the Femto 130 receiving the configuration instruction D3, the RRC function unit 425 controls the configuration file processing unit 423 to write the configuration instruction D3 into the configuration file 412a (step S806). The RRC function unit 425 then reads the configuration file 412a via the configuration file processing unit 423 (step S807) and transmits the configuration instruction D3 including a communication restriction, etc. to the terminal 104.

Figure 9:
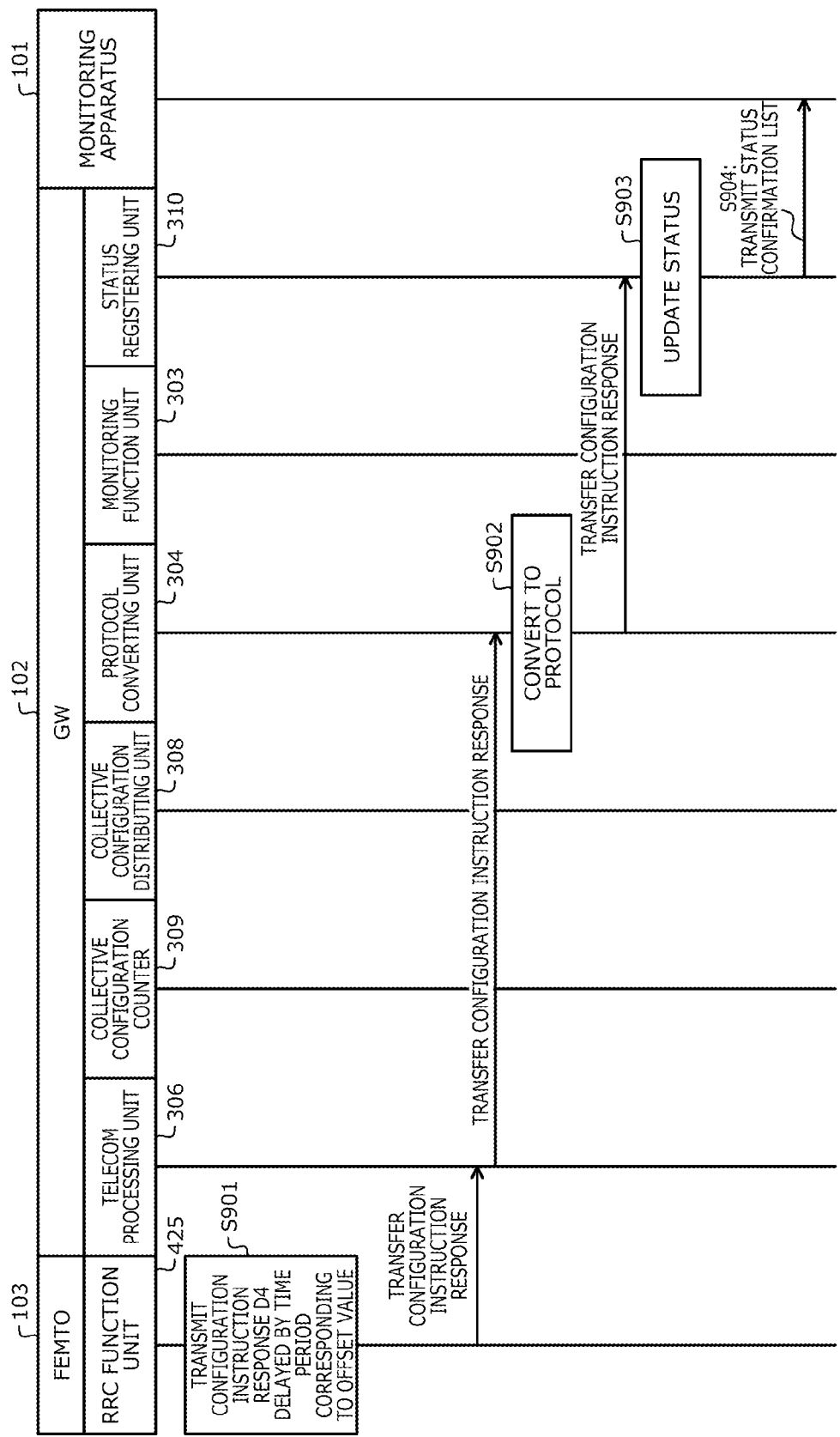
FIG. 9 is a sequence diagram of processing procedures for a configuration instruction response of the overall system according to the embodiment.

FIG. 9 is a sequence diagram of processing procedures for a configuration instruction response of the overall system according to the embodiment. The terminal 104 executes a process of communication restriction, etc. corresponding to the configuration instruction D3 and transmits the configuration instruction response D4 to the Femto 103. The Femto 103 transfers the configuration instruction response D4 from the terminal 104 to the GW 102.

As described above, the configuration instruction D3 is transmitted to the Femto 103 (the terminal 104) with the offset value T for each group, and the terminal 104 (the Femto 103) transmits the configuration instruction response D4 to the GW 102 at timing differentiated (delayed) by a time period corresponding to this offset value T for each group (step S901, see FIG. 1).

The telecom processing unit 306 of the GW 102 transfers the configuration instruction response D4 to the protocol converting unit 304 in the order of reception. The protocol converting unit 304 performs the protocol conversion of the configuration instruction response D4 from the protocol of the call control IF into the protocol of the monitoring IF (step S902). The configuration instruction response D4 post protocol conversion is transferred to the status registering unit 310.

The status registering unit 310 registers (updates) the configuration result included in the message of the configuration instruction response D4 into the status confirmation list 312c in the memory 312 (step S903). Subsequently, after the configuration instruction responses D4 are returned from the Femtos 103 of all the groups designated as the collective configuration subjects, the GW 102 transmits the status confirmation list 312c to the monitoring apparatus 101 via the monitoring IF transceiving unit 302 (step S904).

Figure 10:
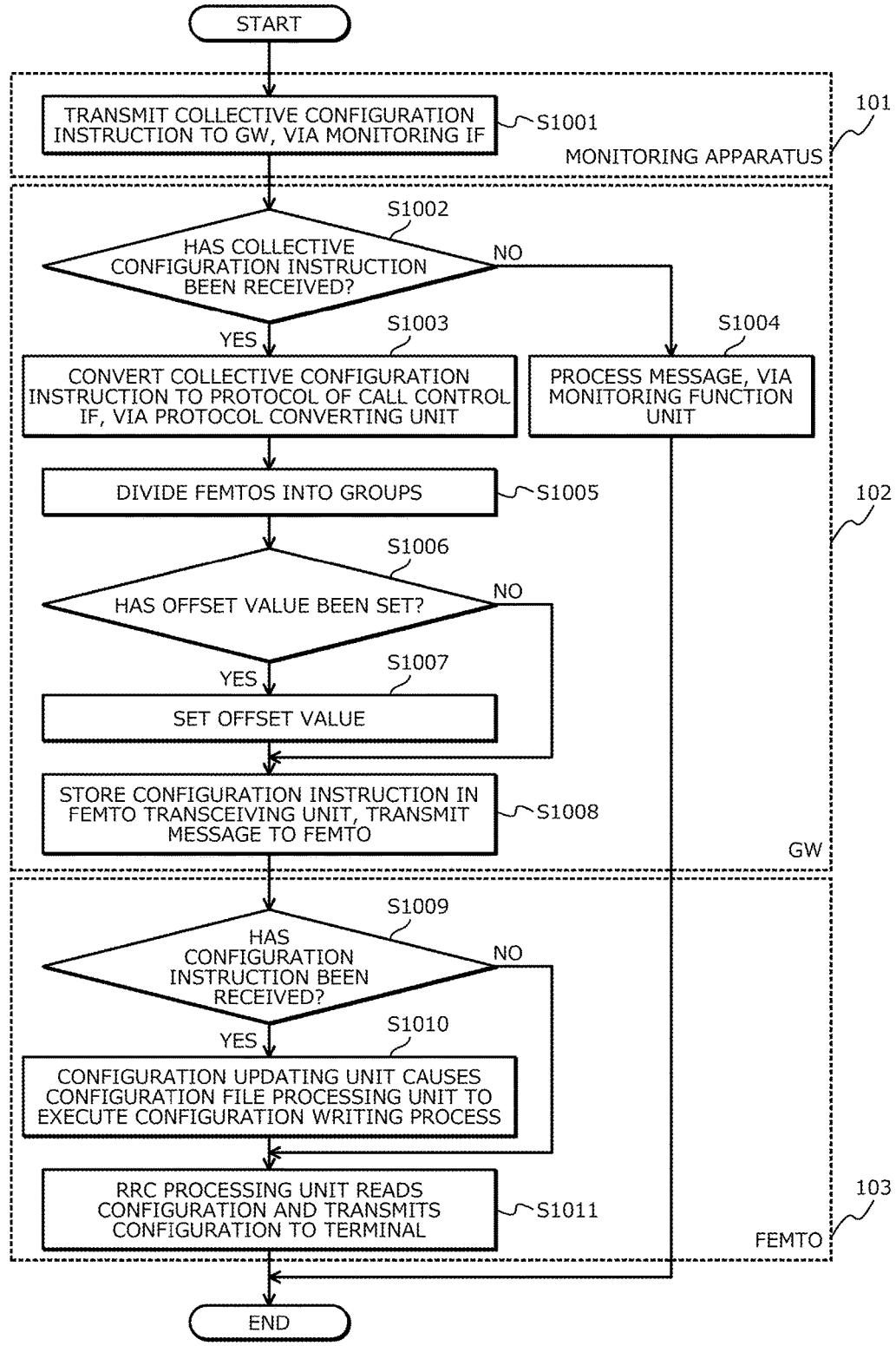
FIG. 10 is a flowchart of processing contents related to the configuration instruction of the overall system according to the embodiment.

FIG. 10 is a flowchart of processing contents related to the configuration instruction of the overall system according to the embodiment. First, the monitoring apparatus 101 transmits the collective configuration instruction D1 to the GW 102, via the monitoring IF 111 (step S1001).

The GW 102 determines whether the collective configuration instruction D1 has been received from the monitoring apparatus 101 (step S1002). When the collective configuration instruction D1 has been received (step S1022: YES), the protocol converting unit 304 converts the collective configuration instruction D1 from the protocol of the monitoring IF 111 into the protocol of the call control IF 112 (step S1003). On the other hand, when a message other than the collective configuration instruction D1 has been received at step S1002 (step S1002: NO), the GW 102 executes an existing message process at the monitoring function unit 303 (step S1004), and the process is terminated.

After step S1003, the GW 102 divides the Femtos 103 into groups by the group division unit 308a of the collective configuration distributing unit 308 (step S1005). Since the Femtos 103 are divided into groups, the configuration instructions D3 are generated of a number corresponding to the groups, from the collective configuration instruction D1 post protocol conversion.

The offset setting unit 308b of the collective configuration unit 308 sets the offset value T according to the group division count according to the group dividing unit 308a (step S1006). Therefore, the offset setting unit 308b determines that the offset value is set when the group division count is one or more (step S1006: YES), and sets the offset value T corresponding to the group division count (step S1007, see FIGS. 6 and 7), and the process goes to step S1008. When the group division count is zero, it is determined that no offset value is set (step S1006: NO) and without a setting of the offset value T (the offset value T=0), the process goes to step S1008.

The configuration instruction D3 is stored in the Femto transceiving unit 307, and the message of the configuration instruction D3 is transmitted to the Femto 103 (step S1008). In this case, since the configuration instruction D3 has the offset value T for each group, the configuration instruction D3 is transmitted to the Femto 103 at a different timing for each group according to the count of the collective configuration counter 309.

The Femto 103 determines the presence/absence of reception of the configuration instruction D3 (step S1009). For example, in response to detection of a reception signal from an apparatus such as the GW 102 in a communication interface on the network side, the Femto 103 judges whether the reception signal is the configuration instruction D3 and thus, determines the presence/absence of reception of the configuration instruction D3.

When the Femto 103 receives the configuration instruction D3 (step S1009: YES), the configuration updating unit 425b causes the configuration file processing unit 423 to execute the writing process of the configuration of the configuration instruction D3 (step S1010), and the process goes to step S1011. As a result, the configuration instruction D3 is written into the configuration file 412a. On the other hand, although a signal received from the apparatus such as the GW 102 is detected in the communication interface on the network side, when the received signal is not the configuration instruction D3 and is the S1 message from MME, for example, it is determined that the configuration instruction D3 has not been received (step S1009: NO) and the process goes to step S1011.

Subsequently, at step S1011, when a predetermined transmission timing has come, the RRC processing unit 425a transmits to the terminal 104, the control information based on the contents read from the configuration file 412a via the configuration file processing unit 423 (step S1011). As a result, if the configuration instruction D3 is written in the configuration file 412a, the contents indicated by the configuration instruction D3, for example, the control information based on the configuration of communication restriction, are transmitted to the terminal 103.

FIG. 11 is a diagram for explaining reception of a configuration instruction response from the base station by the gateway apparatus according to the embodiment. The Femto 103 in the target group receiving the configuration instruction D3 restricts communications with the terminal 104. The Femto 103 completing the collective configuration process transmits the configuration instruction response D4 to the GW 102. This is because the Femto 103 distinguishes the configuration instruction response D4 from a message process in which the Femto 103 uses the existing monitoring IF 111 between the monitoring apparatus 101 and the Femto 103. The Femto 103 generating the message of the configuration instruction response D4 stores the message of the configuration instruction response D4 in the GW transceiving unit 424 and transmits the message to the GW 102. In this case, a parameter of configuration success or configuration failure is set as the message contents of the configuration instruction response D4.

The GW 102 outputs to the collective configuration determining unit 306a of the telecom processing unit 306, the configuration instruction response D4 received by the Femto transceiving unit 307 from the Femto 103. The collective configuration determining unit 306a outputs the configuration instruction response D4 to the protocol converting unit 304, and the protocol converting unit 304 converts the protocol of the monitoring IF 111. The collective configuration determining unit 306a distinguishes the S1 message for MME and the message of the configuration instruction response D4. The configuration instruction response D4 for which the protocol conversion is performed is stored in the monitoring IF transceiving unit 302 and transmitted via the monitoring IF 111 to the monitoring apparatus 101.

An unconverted message 1131 depicted in FIG. 11 is a message used in the protocol of the call control IF 112, and a converted message 1132 is a message used in the protocol of the monitoring IF 111. In this example, the Femto 103 having changed the configuration generates the unconverted message 1131 such that the parameters of the converted message 32 described in FIG. 11 are retained. In this case, the parameters of Warning Messages Contents of the converted message 1132 of FIG. 11 are stored in emergency area (EA) ID.

As depicted in FIG. 11, "004, 001" is newly stored in EAID as the unconverted message 1131 of the configuration instruction response D4 when configuration is successful ("004,000" is stored when configuration has failed). The GW 102 then performs the protocol conversion of the unconverted message 1131 and generates the converted message 1132 of the configuration instruction response D4. In this case, the parameter of EAID of the unconverted message 1131 is converted to Inform of the converted message 1132.

When configuration is successful at all the Femtos 103 on the basis of HeNB Group indicated by the target area information, Status of Inform is newly added and "001" is stored in the converted message 1132. When configuration has failed, "000" is stored. Additionally, the number of the Femtos 103 for which configuration is successful/has failed may also be stored.

Figure 12A:
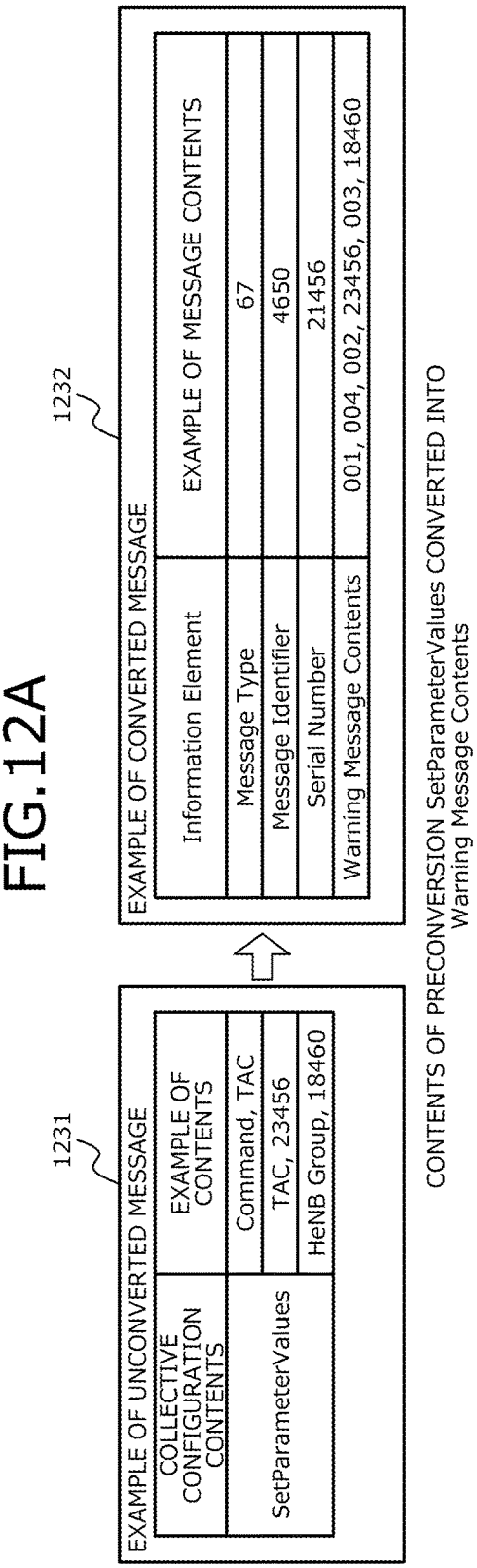
FIGS. 12A and 12B depict other exemplary protocol conversions performed by a protocol converting unit of the gateway apparatus according to the embodiment.
Figure 12B:
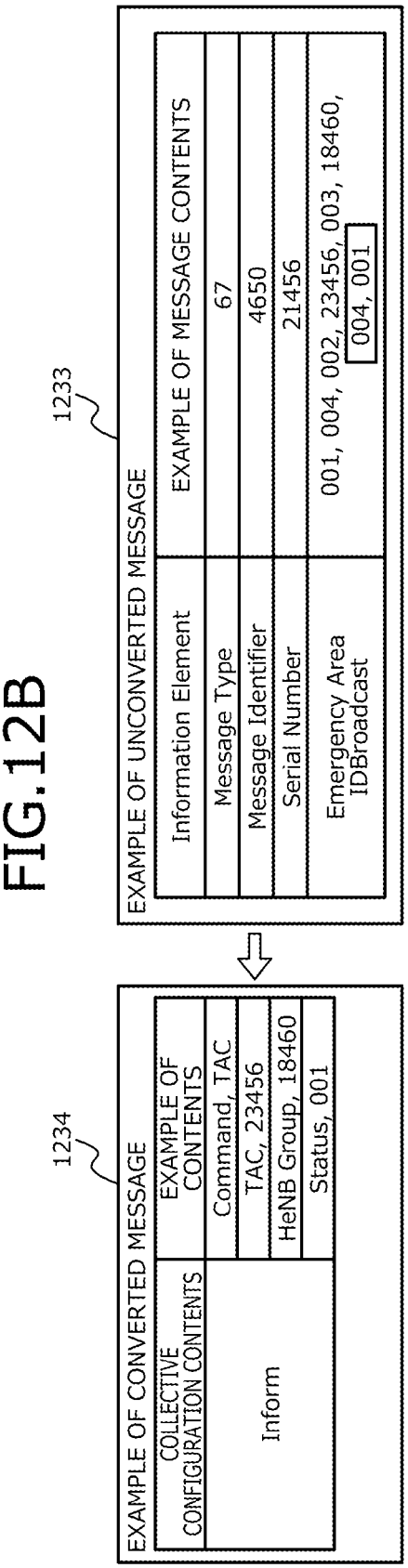

FIGS. 12A and 12B depict other exemplary protocol conversions performed by the protocol converting unit of the gateway apparatus according to the embodiment. FIG. 12A depicts conversion messages of the collective configuration instruction D1 at the time of transmission from the GW 102 to the Femto 103. Contents of SetParameterValues of an unconverted message 1231 are converted to Warning Message Contents of a converted message 1232.

This example represents a case of simultaneously changing TACs of the Femtos 103 in a certain area (e.g., a certain group described above). The three parameters (collective configuration content, target area information, and configuration pattern) of communication restriction indicated by the collective configuration instruction D1 are stored in Warning Messages Contents of the converted message 1232. In this parameter conversion, Command and TAC information indicating the collective configuration content of the unconverted message (the collective configuration instruction D1) are converted to "001, 004". "TAC, 23456" indicating the configuration pattern is converted to "002, 23456". "HeNB Group, 18460" indicating the target area information is converted to "003, 18460".

In this way, when the TAO information is used, unlike the case of using the ACB information described above, the Femto 103 reflects the configuration instruction D3 only in the configuration file 412a in the apparatus (the Femto 103). In this case, the Femto 103 does not cause the RF unit 413 to function and does not transmit a transmission message to the terminal 104.

FIG. 12B depicts conversion messages of the configuration instruction response D4 at the time of transmission from the Femto 103 to the GW 102. The Femto 103 having changed the configuration generates an unconverted message 1233 such that the parameters of the converted message 1232 described in FIG. 12A are retained. In this case, the parameters of Warning Message Contents of the converted message 1232 of FIG. 12A are stored in Emergency Area (EA) ID.

As depicted in FIG. 12B, "004, 001" is newly stored in EAID as the unconverted message 1233 of the configuration instruction response D4 when configuration is successful ("004,000" is stored when configuration has failed). The GW 102 then converts the protocol of the unconverted message 1233 and generates the converted message 1134 of the configuration instruction response D4. In this case, the parameter of EAID of the unconverted message 1233 is converted to Inform of the converted message 1134.

When configuration is successful at all the Femtos 103 on the basis of HeNB Group indicated by the target area information, Status of Inform is newly added and "001" is stored in the converted message 1234. When configuration has failed, "000" is stored. Additionally, the number of the Femtos 103 for which configuration is successful/has failed may also be stored.

Next, the protocol conversion of the messages described above will be described in detail. Description will first be made of a case of using a portion of an Information Element (IE) of an existing message of the call control IF protocol as the collective configuration instruction D1. A message configuration example will be described by taking the collective configuration instruction D1 of ACB as an example. To use ACB, the monitoring apparatus 101 sends an instruction to the GW 102, for example, by using TR069 IF as the monitoring IF 111. The GW 102 also uses S1 IF as the call control IF 112. In TR069 IF, target items and configuration values thereof are stored in SetParameterValues (see the unconverted message 531, etc. of FIG. 5). The monitoring apparatus 101 gives restriction information of ACB and object HeNB information to the GW 102, and the GW 102 maps the restriction information of ACB and the object HeNB information to an S1 message.

Configuration items of ACB include, for example, a type of communication to be restricted, a time of execution of the restriction, an approximate proportion of terminals subject to the restriction, a terminal excluded from the restriction, etc. FIG. 13 is a table of a list of parameters and item contents of control information of ACB used in TR069 IF serving as a monitoring IF in the system according to the embodiment.

FIG. 14 is a table of an example of mapping of a collective configuration request to an S1 message according to the gateway apparatus of the embodiment. The GW 102 receiving ACB restriction information included as the collective configuration instruction D1 from the monitoring apparatus 101 maps message contents to the S1 message (WRITE-REPLACE WARNING REQUEST) depicted in FIG. 14. In this case, for example, various kinds of information necessary for setting ACB may be stored in Warning Message Contents.

FIG. 15 is a table of an example of mapping of a configuration request response using the S1 message from the base station to the GW according to the embodiment. The Femto 103 sets the ID (eNB ID) of the Femto 103 in Broadcast Completed Area List of WRITE-REPLACE WARNING RESPONSE and sends the message to the GW 102.

A case of using TAC for the collective configuration instruction D1 will be described. When TAC is used for the collective configuration instruction D1, as depicted in FIG. 12A, the monitoring apparatus 101 uses Set Parameter Values of the unconverted message 1231 of the monitoring IF 111 to send the message of the collective configuration instruction D1 to the GW 102. The GW 102 converts the received message of the collective configuration instruction D1 into the converted message 232 (the configuration instruction D3) of the call control IF 112 and transmits the message to the Femto 103.

On the other hand, for the configuration instruction response D4 from the Femto 103, as depicted in FIG. 12B, the parameter of configuration success/configuration failure is added to the unconverted message 1233, which is transmitted to the GW 102.

Description will be made of a case of using IE added to an existing message of the call control IF protocol as the collective configuration instruction D1. FIG. 16 is a table of another example of mapping of a collective configuration request to an S1 message according to the gateway apparatus of the embodiment. The GW 102 receiving ACB restriction information included as the collective configuration instruction D1 from the monitoring apparatus 101 additionally maps IE to the S1 message (WRITE-REPLACE WARNING REQUEST) depicted in FIG. 14. For example, a predetermined value indicating restriction information of ACB is stored as ACB Info. With regard to the mapping of the configuration request response using the S1 message from the base station 103 to the GW 102, an example corresponding to FIG. 16 is the same as that depicted in FIG. 15.

A case of adding and using a new message of the call control IF protocol as the collective configuration instruction D1 will be described. FIG. 17 is a table of an example of an S1 message according to the gateway apparatus of the embodiment. In FIG. 17, parameters 1701 are an existing message and parameters 1702 of a new message are added thereto. These parameters 1702 of the new message may be the same as the items used in the monitoring IF 111 (TR069) described above, for example.

Figure 18:
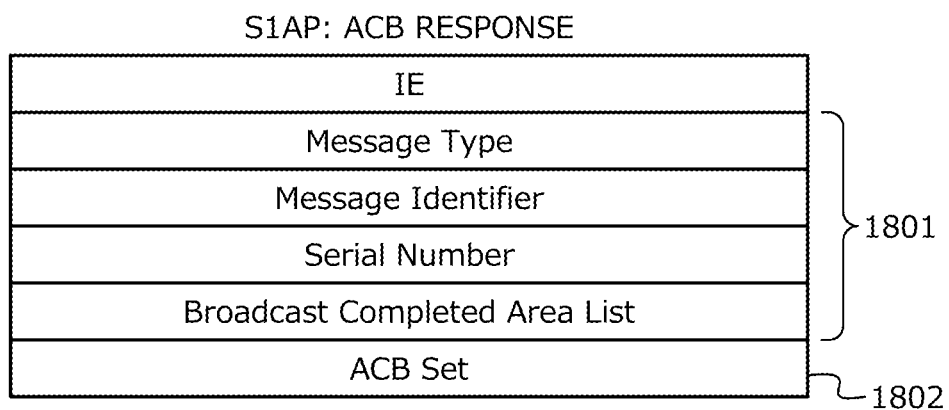
FIG. 18 is a table of an example of mapping of a configuration request response using the S1 message from the base station to the GW according to the embodiment.

FIG. 18 is a table of an example of mapping of a configuration request response using the S1 message from the base station to the GW according to the embodiment. In FIG. 18, parameters 1801 are an existing message. A parameter 1802 of a new message is added thereto. The new parameter 1802 is, for example, ACB Set, and is made up of information of the configuration instruction (configuration success/configuration failure) described above.

FIG. 19 is a sequence diagram of procedures of configuration instructions to multiple base stations according to an existing technique. The procedures of the configuration process for the base stations according to an existing technique will be described with reference to FIG. 19 and compared with the embodiment.

The monitoring apparatus 101 transmits a configuration instruction D30 via the monitoring IF 111 sequentially to each of the Femtos 103. Each of these transmissions is associated with the connection D0 and the connection break D6 of a monitoring protocol between the monitoring apparatus 101 and the Femto 103 and therefore takes time. Since the monitoring protocol is limited in the number of sessions that may be connected concurrently, the configuration instructions must separately be given, for example, for every 100 apparatuses. In FIG. 19, the configuration instruction response D40 is sent from the first Femto #1 (103) after the monitoring apparatus 101 sends the configuration instruction D30 to the Femto #100 (103); however, each of the Femtos 103 transmits the configuration instruction response D40 as appropriate when the configuration process is completed after receiving the configuration instruction D30.

Comparing FIG. 19 with the embodiment (FIG. 2), the monitoring apparatus 101 in the embodiment performs the connection D0 and the connection break D6 of the monitoring protocol only once for the Femtos 103 due to the collective configuration instruction D1 and, therefore, the processing time may be shortened significantly as compared to the existing mode (FIG. 19). In this case, the time of connection of the monitoring apparatus 101 to the GW 102 may also be reduced, enabling the processing load of the monitoring apparatus 101 to be reduced. In particular, the call control IF 112 between the GW 102 and the base stations 103 is continually connected whereby the need for negotiation for connection may be eliminated, enabling the communication configuration of the multiple base stations 103 to be performed easily.

The GW 102 is continually connected to the base stations (Femtos) 103 via the call control IF 112, and the GW 102 and the multiple base stations 103 exchange messages by using existing messages. As a result, the communication configuration for the base stations 103 (and the end terminals 104) may be performed collectively without putting a processing load on the GW 102 and the base stations 103. In this case, the communication configuration may be performed for the multiple base stations 103 under the GW 102 monitored by the monitoring apparatus 101 without affecting a core node such as MME at the upper level of the GW 102.

According to the embodiment described above, a GW may configure communication restrictions for a large number of subordinate base stations in a short time. Additionally, processes of monitoring and configuring a large number of base stations may be quickly and efficiently performed by one monitoring apparatus without increasing monitoring apparatuses such as servers. Therefore, for example, even when communication restriction must be performed urgently due to an unexpected disaster, etc., the communication restriction for multiple base stations may be performed simultaneously in a short time.

In the embodiment, since the GW divides the subordinate base stations into multiple groups and transmits a configuration instruction at a different timing for each of the groups, the GW may receive the configuration instruction responses from the multiple base stations at a different timing for each of the groups in a distributed manner. As a result, even if one GW accommodates an enormous number of subordinate base stations and it becomes necessary to urgently perform communication restriction of the base stations simultaneously, the processing required for the processes of the configuration instructions and configuration instruction responses may be distributed, and the processing burden on the GW may be reduced so that the congestion at the GW may be prevented. The GW may stably perform processing for retransmission to the base station to which the transfer of the configuration information has failed or processing for the notification of a result to a network administrator, so that configuration instructions may be performed quickly even at the time of a disaster. Additionally, the communications related to the configuration instructions and the configuration instruction responses between the GW and a large number of the base stations is performed in a distributed manner in terms of timing, so that network congestion can be prevented.

A program executed by the CPUs of the base station and the GW according to the collective configuration described in the present embodiment may be implemented by executing a prepared program on a computer such as a personal computer and a workstation. The program is stored on a non-transitory, computer-readable recording medium such as a hard disk, a flexible disk, a CD-ROM, an MO, and a DVD, read out from the computer-readable medium, and executed by the computer. The program may be distributed through a network such as the Internet.

According to an embodiment, congestion may be prevented at the time of communication configuration of multiple base stations.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A gateway apparatus comprising:
 a first inter-device interface configured to communicate with a monitoring apparatus;
 a second inter-device interface configured to communicate with a plurality of subordinate base station apparatuses;
 a memory; and
 a processor coupled to the memory,
 wherein the processor is configured to:
 generate first configuration information when second configuration information is received from the monitoring apparatus via the first inter-device interface, the processor generating the first configuration information by performing protocol conversion of converting the second configuration information into a format adapted to the second inter-device interface for the plurality of base station apparatuses;
 divide the plurality of base station apparatuses into predetermined groups; and transmit the generated first configuration information to the plurality of base station apparatuses via the second inter-device interface,
at a different timing for each of the groups based on an offset value corresponding to a count of the groups; and
wherein the count of the groups corresponds to a number of the base station apparatuses accommodated as subordinates or a processing load state of the gateway apparatus.

2. The gateway apparatus according to claim 1, wherein the first inter-device interface is a monitoring interface,
the second inter-device interface is a call control interface, and
the second configuration information for the plurality of base station apparatuses is received by establishing a connection to the monitoring apparatus one time via the monitoring interface.

3. The gateway apparatus according to claim 1, wherein the processor, when receiving from the plurality of base station apparatuses, response information of a configuration state based on the first configuration information, transmits collectively to the monitoring apparatus, the response information from the plurality of base station apparatuses.

4. The gateway apparatus according to claim 1, wherein the processor is further configured to determine whether information received from the monitoring apparatus is the second configuration information, and
the processor performs the protocol conversion for the second configuration information and transmits the converted first configuration information to the plurality of base station apparatuses, when the information received from the monitoring apparatus is the second configuration information.

5. A system comprising:
a monitoring apparatus;
a gateway apparatus; and
a plurality of base stations apparatuses connected to the monitoring apparatus via the gateway apparatus, wherein:
the monitoring apparatus transmits second configuration information for the plurality of base stations apparatuses via a first inter-device interface configured to communicate with the gateway apparatus;
the gateway apparatus has a memory and a processor coupled to the memory, the processor configured to generate first configuration information when the second configuration information is received from the monitoring apparatus, the processor generating the first configuration information by performing protocol conversion of converting the second configuration information into a format adapted to a second inter-device interface for the plurality of base station apparatuses;
the processor is configured to: divide the plurality of base station apparatuses into predetermined groups, and transmit the generated first configuration information to the plurality of base station apparatuses via the second inter-device interface
at a different timing for each of the groups based on an offset value corresponding to a count of the groups;
the count of the groups corresponds to a number of the base station apparatuses accommodated as subordinates or a processing load state of the gateway apparatus.

\* \* \* \* \*